Patented June 26, 1945

UNITED STATES PATENT OFFICE 2,379,354

2,379,354

RUBBER DERIVATIVES

Frederick Hilton, Welwyn Garden City, England, assignor to The British Rubber Producers' Research Association, London, England, a body corporate of Great Britain No Drawing. Application August 19, 1942, Serial No. 455,358. In Great Britain December 16, 1940

3 Claims. (Cl. 260—769)

This invention relates to rubber derivatives with more especial reference to processes for the manufacture of reaction products of sulphur dioxide and rubber, with or without other unsaturated substances.

Various proposals have heretofore been made for combining sulphur dioxide and unsaturated substances with the assistance of catalysts and it has also been proposed to treat rubber with compressed sulphur dioxide in the presence of oxygen but, so far as we are aware, hitherto known processes are subject to considerable practical disadvantages among which may be mentioned the slowness of the reaction and the difficulty of regulating the character and quality of the products obtained.

The present invention has for its object to remove these disadvantages and provide commercially practicable processes for the preparation of rubber-sulphur dioxide derivatives of predetermined character varying it may be from elastic, rubber-like substances to brittle resinous materials.

In accordance with the invention, processes for preparing reaction products of sulphur dioxide and rubber, or rubber sulphones containing up to 24% by weight of sulphur, consist in reacting the rubber with sulphur dioxide, preferably in the presence of a solvent, with the sulphur dioxide considerably in excess, and in the presence of a small proportion of a nitrate catalyst such as lithium or aniline nitrate which does not undergo undesirable secondary reactions with the rubber.

It has been found that the reaction proceeds much more rapidly when there is present considerable excess of sulphur dioxide and that larger proportions of the catalyst lithium nitrate exert an adverse effect on the rate of reaction, whilst the character of the product can be most readily regulated by varying the time of the reaction in a closed vessel, and maintaining the other conditions substantially constant, the more protracted the period of reaction the greater the proportion of combined sulphur dioxide and the less rubber-like the product.

In general agents which promote the addition of sulphur dioxide to olefines are appropriate catalysts for the addition of sulphur dioxide to rubber. Light of the appropriate wavelength (2000 to 8000 A.) may facilitate the reaction.

Variations in temperature may have considerable influence on the course of the reaction and in this connection it is of interest that some olefines, e. g. isobutylene cannot be induced to combine with sulphur dioxide if the temperature exceeds a certain value.

The term rubber used herein is intended to embrace unsaturated oxidised derivatives of rubber, and artificial rubbers such as polymerised butadiene, although in the case of rubber obtained from latex the purified hydrocarbon is preferably employed to avoid the likelihood of discolouration in the product and the presence of antioxidents and other substances which might exercise an inhibitory or adverse effect on the reaction. The purified rubber hydrocarbon is conveniently obtained by extraction with petrol ether (B. P. 40–60° C.) from crepe rubber which has previously been exhaustively extracted with acetone.

In the practice of the invention, the reaction is best carried out with the rubber in solution and in a closed mixer of the Werner Pfleiderer type, lined with material inert to the reactants. Suitable solvents are aromatic hydrocarbons, such as benzene which is substantially inert to all the reactants while being a solvent for both the rubber and the catalyst when the sulphur dioxide is present and being miscible with sulphur dioxide in all proportions thus to permit of the use of the high sulphur dioxide concentrations necessary to secure a satisfactory rate of reaction.

The catalyst, preferably lithium nitrate dissolved in a small quantity of methyl or ethyl alcohol, is added to the rubber solution. Under one set of conditions the most satisfactory results were obtained where the lithium nitrate did not exceed 2% by weight calculated on the rubber. Higher concentrations of catalyst cause the rate of reaction to be reduced.

The following examples will serve to illustrate the beneficial effect of the presence of considerable excess of sulphur dioxide. In each case 3.96 g. of lithium nitrate in a small quantity of ethyl alcohol were mixed with 200 litres of a 2.25% (wt./wt.) benzene solution of crepe rubber. Weighed quantities of this mixture were treated with known masses of sulphur dioxide in a Pfleiderer mixer, the reaction being allowed to proceed for 24 hours, before the reaction mixture was discharged, soaked in alcohol to remove the benzene and any unreacted sulphur dioxide, and finally dried in vacuo.

The results obtained are shown in the Table I below:

Table I

| Example | Mass rubber solution | Mass rubber | Mass $SO_2$ | Ratio $SO_2$/rubber | S in product |
|---|---|---|---|---|---|
| | Kilograms | Kilograms | Kilograms | | Percent |
| 1 | 15.9 | 0.36 | 0.54 | 1.5 | 0.2 |
| 2 | 15.6 | 0.359 | 1.14 | 3.3 | 0.4 |
| 3 | 16.7 | 0.38 | 5.6 | 15 | 19.2 |
| 4 | 15.6 | 0.43 | 8 | 19 | 20.3 |

Unless properly stirred the reaction products are jellies which have to be scraped out of the reaction vessel and washed as aforementioned, although the jelly should, by proper stirring, be broken into fine particles which disperse in benzene.

The following Table II illustrates how the nature of the product may be controlled by varying the period of reaction.

Table II

| Example | Reaction time | Product yield | S in product | Appearance and nature of products |
|---|---|---|---|---|
| | Hours | Percent | Percent | |
| 5 | 3 | 95 | 2.3 | Elastic and resembled vulcanised rubber. |
| 6 | 8 | 95 | 7.2 | |
| 7 | 20 | 91 | 9.9 | Brittle resinous dark brown solid. |
| 8 | 141 | 102 | 17.2 | Resinous, white brittle solid. |
| 9 | 22 | | 21.5 | |

Products containing up to about 9% of sulphur are elastic. Their elasticity diminishes and their toughness increases with increasing sulphur content. Products containing about 14% sulphur sheet out on a mill to tough inelastic flexible sheets, while products containing higher percentages of sulphur are less flexible and tend towards brittleness.

Other unsaturated compounds may be included with the rubber in the reaction for the preparation of interpolymers and to vary the nature of the products. Suitable unsaturated substances are those of the class which react with sulphur dioxide in the presence of catalysts to form polysulphones, such as undecylenic acid, allyl chloride and styrene, although it has been found that other unsaturated substances such as methacrylonitrile, which have not been induced to form appreciable quantities of polysulphones when treated with sulphur dioxide may enter into the reaction.

The following Table III will serve to illustrate this aspect of the invention, the proportions being by weight:

other alkali metals and of aniline may be employed in place of lithium nitrate, provided they are such as do not undergo undesirable side reactions with the rubber or other reagents present.

The most ready means of softening the products is by treatment with cyclohexanone, morpholine, cyclohexylamine and piperidine.

Lastly, as will be understood, plasticisers, fillers, pigments and/or appropriate compounding ingredients may be incorporated, before or during the process.

What I claim is:

1. A process for preparing reaction products from a rubber solution consisting in adding to such solution from 1% to 5% allyl chloride, and reacting the mixture with sulphur dioxide in the presence of lithium nitrate as a catalyst to produce an intimate mixture of rubber sulphones, said solution being formed by the use of aromatic hydrocarbon solvent, the latter acting as a solvent for both the rubber and the catalyst and being miscible with sulphur dioxide.

2. A process for preparing a reaction product from a rubber solution consisting in adding to such solution from 1% to 5% of styrene, reacting the mixture with a sulphur dioxide in the presence of lithium nitrate as a catalyst to produce an intimate mixture of rubber and styrene, said solution being formed by the use of aromatic hydrocarbon solvent, the latter acting as a solvent for both the rubber and the catalyst and being miscible with sulphur dioxide.

3. A process for preparing a reaction product from a rubber solution consisting in adding to such solution from 1% to 5% of a compound selected from the group consisting of allyl-chloride, styrene and methacry-lonitrile, reacting the mixture with sulphur dioxide in the presence of lithium nitrate as a catalyst to produce an intimate mixture of rubber sulphones, said solution being formed by the use of aromatic hydrocarbon

Table III

| | Example No. | Crepe rubber | Additional compound | SO₂ | Ratio SO₂/rubber and compound | Reaction time | | Product nature |
|---|---|---|---|---|---|---|---|---|
| | | | | | | Hours | Yield | |
| | | Parts by weight | Parts by weight | | | | | |
| Undecylenic acid | 10 | 4.67 | 5.0 | 74 | 7.7 | 24 | 6.4 | White tough solid, sheeted into translucent films. |
| | 11 | 4.78 | 1.0 | 44 | 7.6 | 24 | 4.8 | White, rubber-like. |
| Allyl chloride | 12 | 4.52 | 5.0 | 69 | 7.3 | 24 | 4.9 | White, rubber-like. |
| | 13 | 4.3 | 1.0 | 48 | 9.1 | 168 | | Yellow brittle solid. |
| Styrene | 14 | 4.52 | 5.0 | 69 | 7.3 | 24 | 4.9 | White, rubber-like. |
| | 15 | 4.52 | 1.0 | 45 | 7.8 | 169 | 7.0 | Tough white, nonelastic solid. |
| Methacrylonitrile | 16 | 4.45 | 5.0 | 81 | | 168 | 9.7 | Pale brown brittle resin. |

It will be understood that the invention is not limited to the particular examples furnished, providing the sulphur content of the products does not exceed 24% by weight, and that nitrates of solvent, the latter acting as a solvent for both the rubber and the catalyst and being miscible with sulphur dioxide.

FREDERICK HILTON.